United States Patent
Gaffe et al.

(10) Patent No.: US 10,493,969 B2
(45) Date of Patent: Dec. 3, 2019

(54) BRAKE ASSIST SYSTEM

(71) Applicant: Robert Bosch GmbH, Stuttgart (DE)

(72) Inventors: Francois Gaffe, La Turballe (FR); Philippe Richard, Chelles (FR)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 15/757,491

(22) PCT Filed: Sep. 5, 2016

(86) PCT No.: PCT/EP2016/070848
§ 371 (c)(1),
(2) Date: Mar. 5, 2018

(87) PCT Pub. No.: WO2017/045956
PCT Pub. Date: Mar. 23, 2017

(65) Prior Publication Data
US 2019/0023249 A1    Jan. 24, 2019

(30) Foreign Application Priority Data

Sep. 14, 2015 (FR) ..................... 15 58556

(51) Int. Cl.
*B60T 13/74* (2006.01)
*B60T 7/04* (2006.01)
(Continued)

(52) U.S. Cl.
CPC ............ *B60T 13/745* (2013.01); *B60T 7/042* (2013.01); *B60T 7/12* (2013.01); *B60T 13/62* (2013.01); *B60T 13/66* (2013.01); *B60T 2201/03* (2013.01)

(58) Field of Classification Search
CPC ........ B60T 13/745; B60T 13/62; B60T 13/66; B60T 7/042; B60T 7/12; B60T 2201/03;
(Continued)

(56) References Cited

U.S. PATENT DOCUMENTS

| | | | |
|---|---|---|---|
| 2011/0048874 A1* | 3/2011 | Vollert | B60T 13/745 188/152 |
| 2011/0297493 A1* | 12/2011 | Vollert | B60T 7/042 188/106 R |
| 2014/0197680 A1 | 7/2014 | Gilles | |

FOREIGN PATENT DOCUMENTS

| | | |
|---|---|---|
| EP | 2733032 A1 | 5/2014 |
| JP | H0911887 A | 1/1997 |
| WO | 2014177698 A1 | 11/2014 |

OTHER PUBLICATIONS

International Search Report dated Nov. 22, 2016, of the corresponding International Application PCT/EP2016/070848 filed Sep. 5, 2016.

* cited by examiner

*Primary Examiner* — Xuan Lan Nguyen
(74) *Attorney, Agent, or Firm* — Gerard A. Messina; Norton Rose Fulbright US LLP

(57) ABSTRACT

A brake assist system comprising an intermediate spring combined with a compression thrust bearing, limiting the compression to a force greater than the response of the brake pedal under normal operating conditions. The spring and its compression thrust bearing are placed between the plunger piston (2) and the helper piston so that the spring transmits the thrust from the helper piston to the plunger piston that pulls the pedal under normal braking conditions. The helper piston pushes the plunger piston by way of the compression thrust bearing when the response of the plunger piston exceeds the compression threshold. A contact detector detects the contact between the helper piston and the thrust bearing.

7 Claims, 3 Drawing Sheets

(51) Int. Cl.
　　　*B60T 7/12*　　　　(2006.01)
　　　*B60T 13/62*　　　(2006.01)
　　　*B60T 13/66*　　　(2006.01)
(58) Field of Classification Search
　　　CPC ............. F16D 2123/00; F16D 2121/02; F16D
　　　　　　　　　　　　　　　2121/14; F16D 2125/04
　　　See application file for complete search history.

BRAKE ASSIST SYSTEM

FIELD

The present invention relate to an electromechanical brake-assist system, capable of autonomous operation, controlled by a management unit and driven by an electric motor cooperating with a master cylinder and having, along actuating axis xx: a helper piston connected to the drive motor, a plunger piston, one of whose extremities is able to act on the master cylinder in parallel with the helper piston, its other extremity being connected to a control rod, which is itself connected to the brake pedal, the plunger piston being pushed by the helper piston to pull the control rod.

The brake assist system is applied to a master cylinder controlled either by action on the brake pedal, whether such action is assisted or is direct without assistance, or by an autonomous action requested by the braking system management unit, based on parameters or events that have been detected, generally in connection with safety.

BACKGROUND INFORMATION

Conventionally, the helper piston is applied to the plunger piston during the assist phase of braking in such a way that the plunger piston pulls the control rod and the brake pedal. Advance of the plunger piston triggers the assist operation so that it no longer presses against the reaction disk.

Under normal conditions, this advance is not noticed by the driver because his action on the brake pedal initiates the braking operation. When he releases the pressure, the pedal returns to its neutral position. If an obstacle is found beneath the brake pedal, for example, an object that has fallen and accidentally lands beneath the brake pedal, the driver notices this resistance and corrects the situation.

In the case of autonomous braking, assisted braking is triggered by the brake system management unit without the driver pressing on the brake pedal, which is drawn by the plunger piston throughout the action. This provides a haptic signal for the driver if his foot is on the brake pedal. But if the driver's foot or an obstacle is present beneath the brake pedal, there is a risk that the foot may be crushed or injured. If the obstacle is resistant, given that brake assistance is continuous, there is a risk of damaging the components of the braking system, such as the electric motor, which, while being powered, is prevented from rotating.

SUMMARY

The present invention provides an improvement to the safety of electromechanical brake assist systems driven by an electric motor and capable of operating in autonomous mode.

An object of the present invention is an electromechanical brake assist system of the type described above, characterized in that it has an intermediate spring combined with a compression thrust bearing, limiting the compression of the spring to a predetermined compressive force greater than the response of the brake pedal under normal brake assist operating conditions, the intermediate spring and its compression thrust bearing being inserted between the plunger piston and the helper piston, the intermediate spring transmitting the thrust from the helper piston to the plunger piston pulling the pedal under normal braking conditions, the helper piston pushing the plunger piston by means of the compression thrust bearing when the response of the plunger piston exceeds the predetermined compressive force, a contact detector detecting the contact between the helper piston, the thrust bearing, and the plunger piston, this detector being connected to the brake system management unit.

The helper system according to the present invention has the advantage of being protected when operating in autonomous mode or when the brake pedal is blocked by an obstacle. The situation is detected by the central unit, which analyzes the situation for the purpose of correcting it without continuing, at least provisionally, the thrust exerted on the intermediate piston and the consequent tractive force of the control rod and brake pedal. In this way accidents can be avoided, especially an accident resulting from the presence of a foot beneath the brake pedal during autonomous operation of the braking system or the destruction of one or more components of the helper system if an incompressible object is encountered by the brake pedal and the tractive movement continues, that is, compression by the helper system.

According to a particularly interesting embodiment, the helper piston is shaped like an axial sleeve integral with a rotating retainer clip for translational guidance, the sleeve having an external surface equipped with a thread that cooperates with a nut fixed in translation but free to rotate, with an internal thread that complements that on the helper piston that it receives and having, externally, a gear connected to the drive motor, the forward extremity of the plunger piston having a drive base so it can be pushed by the helper piston, the compression thrust bearing being supported by the drive base at a certain distance from the axis to form an annular interval around the body of the plunger piston facing the helper piston, the intermediate spring being in the form of a Belleville spring housed in the annular interval and extending axially beyond the compression thrust bearing to accommodate the helper piston and transmit its thrust to the plunger piston before the helper piston makes contact with the compression thrust bearing when the reaction of the plunger piston exceeds the predetermined compressive force of the intermediate spring.

This embodiment is particularly beneficial in its simplicity because the compression thrust bearing is integrated with the guide elements, which themselves constitute a subassembly of the plunger piston and consist of separate elements, housed in the openings in the fingers of the plunger piston drive base.

According to another advantageous embodiment of the present invention, the contact detector is a differential travel detector that detects the differential travel of the plunger piston and the helper piston.

According to another advantageous embodiment of the present invention, the helper piston transmits the helper thrust to the master cylinder through an intermediate piston applied to the reaction disk on the master cylinder pushrod, this intermediate piston having an axial, cylindrical skirt, accommodating the drive base of the plunger piston and guide elements for the plunger piston housed in the guide bearings of the helper piston clip, the intermediate piston supporting the differential travel detector that detects the travel between the helper piston and the plunger piston.

According to another particularly advantageous embodiment of the present invention, the compression thrust bearing consists of a relief element on each guide element of the drive base.

BRIEF DESCRIPTION OF THE DRAWINGS

The present invention is described in greater detail by means of an example of an electromechanical brake assist system, shown in the figures.

FIG. 2A shows the helper system at rest,

FIG. 2B shows the helper system in its normal assistance mode,

FIG. 2C shows the brake assist system in autonomous mode in the event of a blockage of the brake pedal;

DETAILED DESCRIPTION OF EXAMPLE EMBODIMENTS

By convention, in the various figures, the parts shown are oriented with respect to the xx axis of the helper system, the front part (AV) being on the left, the rear part (AR) being on the right.

The terms "front" and "rear" used in the description are based on this convention.

Figure 1:
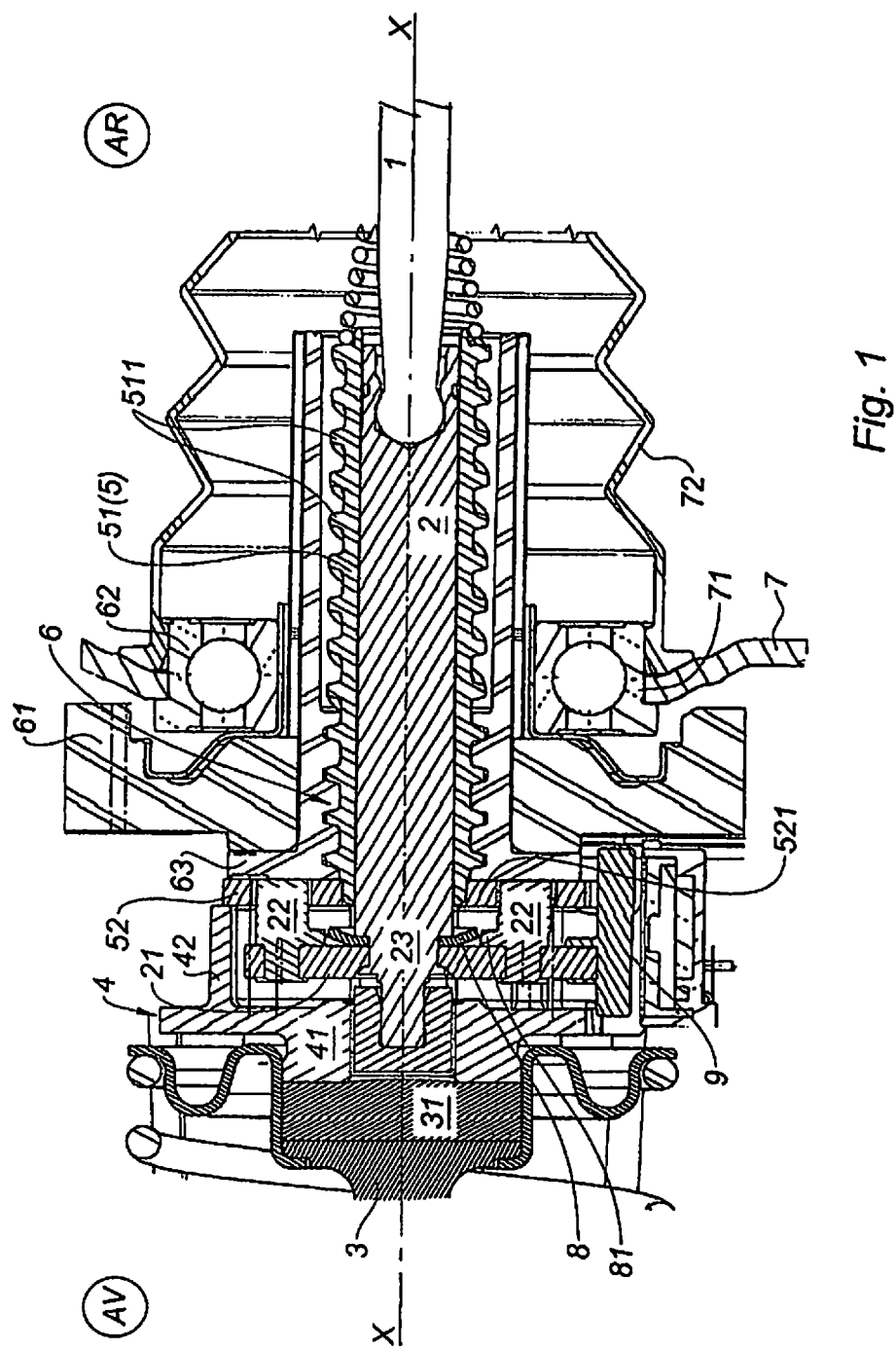
FIG. 1 is an axial cutaway of the principal part of an electromechanical brake assist system according to the present invention.

According to FIG. 1, the brake assistance device, of which only the main elements for describing the present invention have been shown, acts on the master cylinder as controlled by the brake pedal either with assistance or directly if the assist fails, or autonomously if the brake system management unit imposes it for safety or other reasons, based on the data collected by the sensors or due to external constraints.

The helper system consists of control rod 1 connected to the brake pedal and plunger piston 2 acting on pushrod 3 by means of reaction disk 31, thereby forming a direct kinematic chain between the brake pedal and the master cylinder.

The helper system, which provides assistance to the braking or autonomous braking operation, independently of an action on the brake pedal, acts on pushrod 3 through intermediate piston 4 in addition to or in parallel to the action on the brake pedal but actuating the brake pedal in its forward movement through pushrod 3.

Helper system means consist of plunger piston 2, whose forward extremity 23 is equipped with drive base 21, formed of cross-shaped branches bearing guide elements 22. Plunger piston 2 is pushed by helper piston 5 formed from axial sleeve 51 freely traversed by the body of plunger piston 2 along axis xx and whose external surface is equipped with thread 511 cooperating with nut 6 fixed in translation, screwed onto this thread 511, and carrying, integrally in rotation, gear 61 connected to the electric motor that provides assistance when it is active.

Gear 61 of nut 6 is carried by ball bearings 62 installed in axial opening 71 of housing 7 of the system and accommodating sleeve-bellows 72.

Nut 6, fixed in translation (along axis xx) causes helper piston 5 to move forward or backward, whose forward extremity is equipped with guide clip 52 in translation and rotationally fixed by means of two bearings on two symmetrical guide rods (in front of and behind the plane of FIG. 1) parallel to axis xx.

Clip 52 has openings 521 forming guide bearings, each of which accommodates a guide element 22 supported by base 21 of the plunger piston. The limited, relative displacement of plunger piston 2 with respect to helper piston 5 occurs by means of guide elements 22, engaged in clip guide bearings 521.

Clip 52 rests upon intermediate piston 4, which itself rests upon reaction disk 31. Intermediate piston 4 has the shape of a crown 41, traversed along axis xx by front 23 of plunger piston 2, which can press against reaction disk 31. Crown 41 of intermediate piston 4 normally presses against the reaction disk to transmit the assistance force. Crown 41 of intermediate piston 4 carries cylindrical skirt 42 against whose edge clip 52 presses to transmit its thrust.

Under normal conditions of assistance, plunger piston 2 touches reaction disk 31 only at the start of a braking action; once assistance is activated, plunger piston 2 separates from reaction disk 31, while following the movement, as is conventional for brake assistance systems.

According to the present invention, intermediate spring 8, together with compression thrust bearing 81, is placed between helper piston 5 and plunger piston 2.

Intermediate spring 8 transmits the thrust from helper piston 5 to plunger piston 2, in parallel with transmission of the assistance thrust to the master cylinder by intermediate piston 4, reaction disk 31, and pushrod 3. Plunger piston 2 can also push reaction disk 31 in parallel or alone if the helper system fails.

Intermediate spring 8 and compression thrust bearing 81 define a compressive force threshold greater than the response that the brake pedal normally exerts with the advance of plunger piston 2. Whenever this response, generated by an obstacle encountered by the brake pedal when depressed by the pull of plunger piston 2, exceeds this threshold, helper piston 5 presses against plunger piston 2 by means of compression thrust bearing 81.

If the obstacle is incompressible, the helper system continues to pull on plunger piston 2 and the pedal with increasing force. However, this situation is detected by contact detector 9. Detector 9 has chip 91, for example, a Hall sensor chip, installed on helper piston 5, and detecting the movement of magnet 92, aligned in the direction of axis xx and borne by drive base 21 of plunger piston 2. Sensor 9, operating as a differential travel detector, determines the contact, for example, between helper piston 5 and plunger piston 2, to initiate a safety procedure.

According to an advantageous embodiment, magnet 92 is a plastic material that includes magnetite, overmolded on base 21.

According to the embodiment shown, compression thrust bearing 81 is integral with guide elements 22, which are equipped with a shim forming thrust bearing 81, limiting the distance between drive base 21 and clip 52 to a predetermined interval of axial length and, therefore, the compression of spring 8 to the threshold compressive force.

Intermediate spring 8, having the shape of a Belleville spring and having known spring characteristics, is housed in the annular volume between thrust bearing 81, formed by the shims, and plunger piston 2. The axial length of spring 8 is greater than the axial dimension of the annular volume of compression thrust bearing 81, so that it projects from bearing 81 on the side turned toward clip 52.

In this embodiment, the intermediate spring is affixed to plunger piston 2 against peripheral shoulder 232, formed by reduction of diameter 231 of the forward extremity 23 of the plunger piston. Spring 8 is compressed by drive base 21, which is itself crimped 233 at the forward extremity 23 of reduced section of plunger piston 2.

Generally, compression thrust bearing 81 could be realized differently or be carried by clip 52 because it is intended to define a compressive limit for intermediate spring 8, beyond which helper piston 5 presses directly on plunger piston 2, thereby moving it.

To summarize, based on the embodiments of the present invention described above, transmission of the thrust from helper piston 5 to plunger piston 2 occurs by means of clip 52 and drive base 21, which are parts, respectively, of helper piston 5 and plunger piston 2.

FIG. 1 illustrates the helper system at rest. In this position, clip 52 presses against flange 63 of nut 6, guide elements 22 also pressing against this flange 63 in such a way that the distance between clip 52 and drive base 21 is at a maximum. Intermediate spring 8 is not in contact.

Figure 2A:
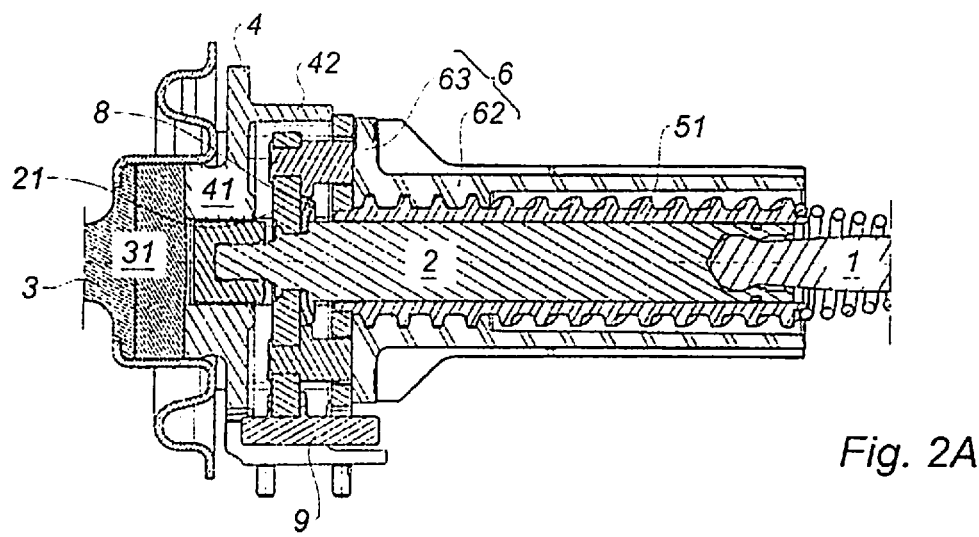
FIGS. 2A, 2B, and 2C show three simplified axial cutaways, analogous to those in FIG. 1, of three characteristic states.
Figure 3A:
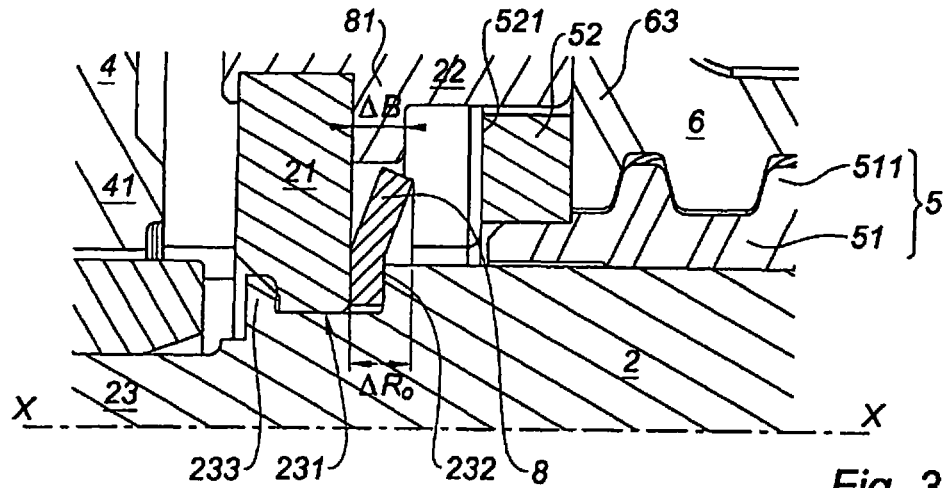
FIGS. 3A, 3B, and 3C show enlargements of FIGS. 2A, 2B, 2C respectively, in a partial axial cutaway of the interval between the helper piston clip and the plunger piston base, with the intermediate spring in various positions.

This rest position is also shown in FIG. 2A and its enlargement in FIG. 3A as being one of the reference positions for describing the implementation of the safety device constituted by the intermediate spring. FIG. 3A notably illustrates the axial length $\Delta R0$ of intermediate spring 8 at rest and axial length $\Delta B$ of the compression thrust bearing, illustrating the difference in length as $\Delta R0 > \Delta B$.

Figure 2B:
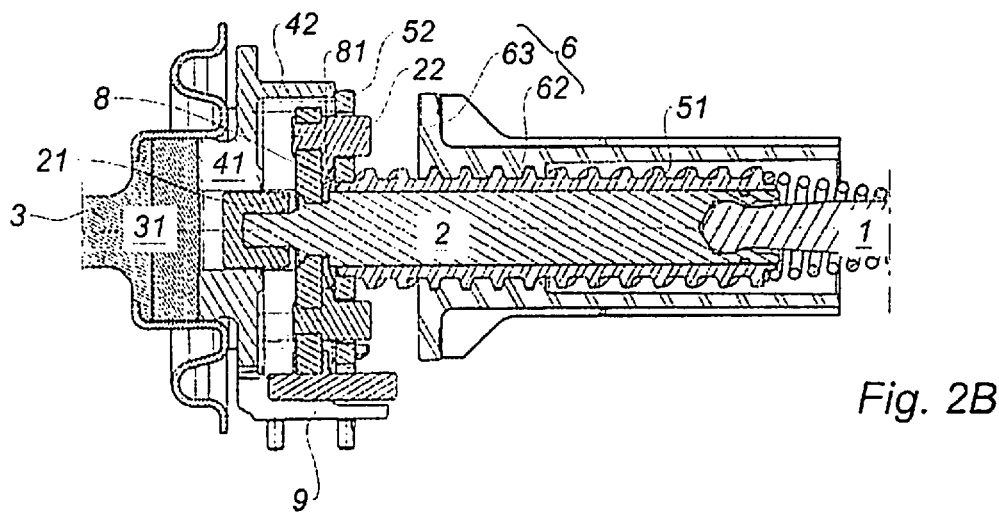
Figure 3B:
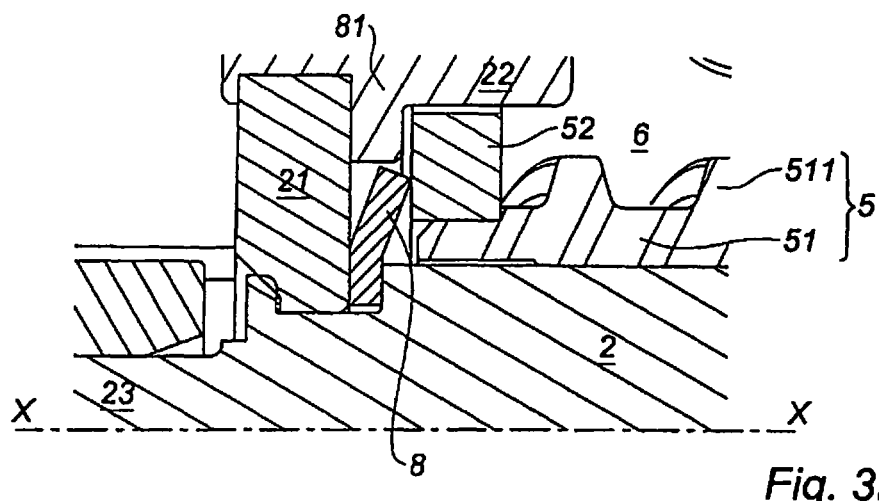

FIGS. 2B, 3B illustrate the state of intermediate spring 8, pistons 2 and 5 in normal assist mode, clip 52 touching intermediate spring 8, thereby pushing base 21 of plunger piston 2 and pulling the brake pedal. In this phase of operation, the clip does not touch thrust bearing 81.

Figure 2C:
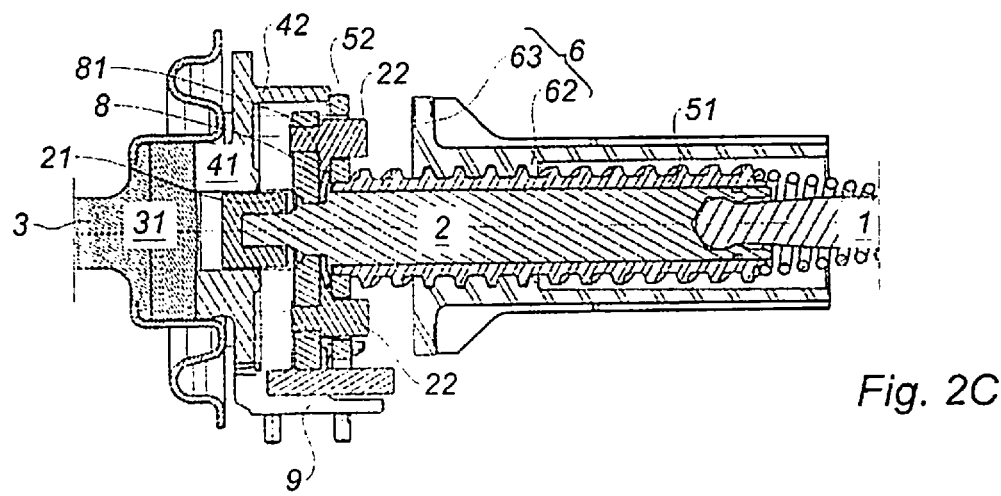
Figure 3C:
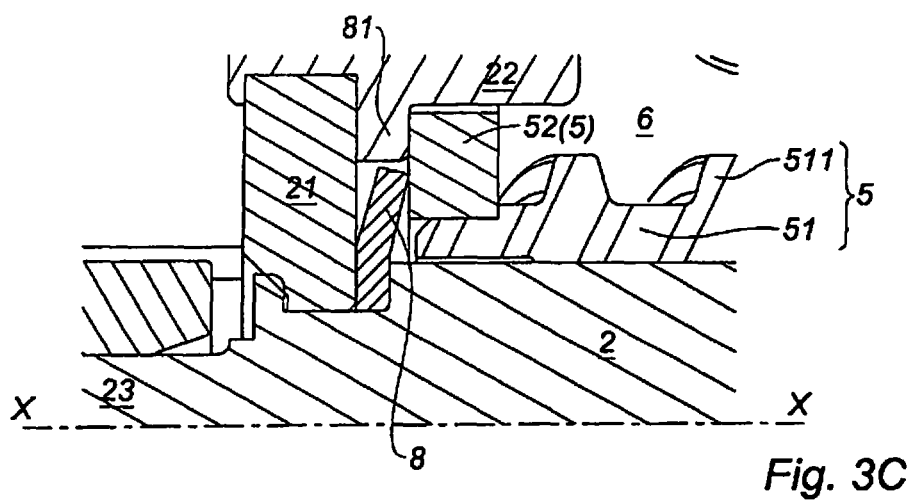

FIGS. 2C, 3C illustrate a main step of the assist system in autonomous mode, with an obstacle blocking the brake pedal and, therefore, the advance of plunger piston 2, in such a way that helper piston 5 continues to advance or push and compress intermediate spring 8 beyond the compressive threshold; it presses against thrust bearing 81, thereby transmitting the assist thrust to compress the obstacle beneath the brake pedal. This force is not transmitted to the master cylinder. Contact detector 9 detects this condition and transmits the information to the central unit of the brake system in order to stop the thrust exerted on plunger piston 2 and handle the incident.

In this way, the present invention prevents any overload from being applied to the kinematic chain between the helper piston and the brake pedal and thus any accident that might be associated with the continuation of compression with traction on the control rod and forced depression of the brake pedal.

REFERENCE KEY

| | |
|---|---|
| 1 | Control rod |
| 2 | Plunger piston |
| 21 | Drive base |
| 22 | Guide element |
| 23 | Front extremity |
| 231 | Reduction of diameter |
| 232 | Peripheral shoulder |
| 3 | Pushrod |
| 31 | Reaction disk |
| 4 | Intermediate piston |
| 41 | Crown |
| 42 | Skirt |
| 5 | Helper piston |
| 51 | Axial sleeve |
| 511 | Thread |
| 52 | Clip |
| 521 | Opening forming a guide bearing |
| 6 | Nut |
| 61 | Gear |
| 62 | Ball bearing |
| 63 | Flange |
| 7 | Housing |
| 71 | Axial opening |
| 72 | Sleeve-Bellows |
| 8 | Intermediate spring |
| 81 | Compression thrust bearing |
| 9 | Detector |
| 91 | Hall sensor |
| 92 | Magnet |

The invention claimed is:

1. An electromechanical brake assist system capable of autonomous operation, controlled by a braking system management unit and driven by an electric motor cooperating with a master cylinder and having, along an axis of operation:
   a helper piston connected to the drive motor;
   a plunger piston, one of whose extremities configured to act on the master cylinder, in parallel with the helper piston, another one of whose extremities being connected to a control rod which is connected to the brake pedal, the plunger piston being pushed by the helper piston to pull the control rod; and
   a helper system which includes:
      A) an intermediate spring combined with a compression thrust bearing, the compression thrust bearing limiting a compression of the intermediate spring to a predetermined compressive force greater than a response of the brake pedal under norming operating conditions of assisted braking, the intermediate spring and the compression thrust bearing being position between the plunger piston and the helper piston, the intermediate spring transmitting a helper piston thrust from the helper piston to the plunger piston that pulls the pedal under normal braking conditions, the helper piston pushing the plunger piston by means of the compression thrust bearing when a response of the plunger piston exceeds the predetermined compressive force, and
      B) a contact detector detecting contact between the helper piston, the compression thrust bearing, and the plunger piston, the detector being connected to the braking system management unit.

2. The electromechanical brake assist system according to claim 1, wherein the helper piston is shaped like an axial sleeve integral with a rotating retainer clip for translational guidance, the sleeve having an external surface equipped with a thread that cooperates with a nut fixed in translation but free to rotate, with an internal thread that complements that on the helper piston, which it receives, and having, externally, a gear connected to the drive motor, a forward extremity of the plunger piston has a drive base configured to be pushed by the helper piston, the compression thrust bearing being supported by the drive base at a distance from the axis to form an annular interval around the body of the plunger piston facing the helper piston, the intermediate spring being in the form of a Belleville spring housed in the annular interval and axially extending beyond the compression thrust bearing to accommodate the helper piston and transmit its thrust to the plunger piston before the helper piston makes contact with the compression thrust bearing when the reaction of the plunger piston exceeds the predetermined compressive force of the intermediate spring.

3. The electromechanical brake assist system according to claim 1, wherein the contact detector is a differential travel detector detecting the differential travel of the plunger piston and the helper piston.

4. The electromechanical brake assist system according to claim 3, wherein the contact detector is shaped like a Hall sensor borne by the helper piston and cooperating with a magnet oriented in the direction of the axis and borne by the base of the plunger piston.

5. The electromechanical brake assist system according to claim 4, wherein the magnet is made of a plastic material with of magnetite, overmolded on the base.

6. The electromechanical brake assist system according to claim 2, wherein the helper piston transmits the helper piston thrust to the master cylinder through an intermediate piston applied to the reaction disk on the master cylinder pushrod, the intermediate piston having an axial, cylindrical skirt, accommodating the drive base of the plunger piston and guide elements for the plunger piston housed in the guide bearings on the helper piston clip, the intermediate piston supporting the differential travel detector that detects travel between the helper piston and the plunger piston.

7. The electromechanical brake assist system according to claim 6, wherein the compression thrust bearing includes an element in relief on each guide element of the drive base.

* * * * *